United States Patent [19]
Barlow et al.

[11] Patent Number: 5,243,702
[45] Date of Patent: Sep. 7, 1993

[54] MINIMUM CONTENTION PROCESSOR AND SYSTEM BUS SYSTEM

[75] Inventors: George J. Barlow, Tewksbury; Donald L. Smith, Bedford, both of Mass.

[73] Assignee: Bull HN Information Systems Inc., Billerica, Mass.

[21] Appl. No.: 593,437

[22] Filed: Oct. 5, 1990

[51] Int. Cl.$^5$ .............................................. G06F 9/00
[52] U.S. Cl. ..................... 395/325; 395/425; 395/725; 364/240; 364/240.5; 364/242.6; 364/242.7; 364/242.92; 364/264; 364/264.6; 364/270.5; 364/DIG. 1
[58] Field of Search ............... 395/325, DIG. 1, 325, 395/725, 425; 364/200

[56] References Cited

U.S. PATENT DOCUMENTS

| | | | |
|---|---|---|---|
| 3,995,258 | 11/1976 | Barlow | 340/172.5 |
| 4,281,380 | 7/1981 | DeMesa et al. | 364/200 |
| 4,604,685 | 8/1986 | Brown et al. | 364/200 |
| 4,639,859 | 1/1987 | Ott | 364/200 |
| 4,642,630 | 2/1987 | Beckner et al. | 340/825.5 |
| 4,841,295 | 6/1989 | Delaney et al. | 340/825.5 |
| 4,901,226 | 2/1990 | Barlow | 364/200 |
| 4,910,666 | 3/1990 | Nibby, Jr. et al. | 364/200 |
| 4,932,040 | 6/1990 | Barlow | 364/200 |
| 4,992,930 | 2/1991 | Gilfeather et al. | 364/200 |
| 4,993,023 | 2/1991 | Phinney | 340/825.5 |
| 5,099,420 | 3/1992 | Barlow et al. | 395/325 |
| 5,101,482 | 3/1992 | Kipnis | 395/325 |

FOREIGN PATENT DOCUMENTS 0384621 8/1990 European Pat. Off. .

OTHER PUBLICATIONS

European Search Report for corresponding EPO patent application 91116755.9, transmitted in a Communication dated Jul. 14, 1992.

*Primary Examiner*—Michael R. Fleming
*Assistant Examiner*—Tarig R. Hafiz
*Attorney, Agent, or Firm*—Faith F. Driscoll; John S. Solakian

[57] ABSTRACT

A multiprocessor system includes a plurality of central subsystem (CSS) units, a plurality of memory units and input/output units which connect in common to a system bus for transferring requests between a pair of units on a priority basis defined by a distributed bus priority network included as part of the system bus. A private bus (P bus) connects all of the CSS units and memory units in common for high speed block data transfers. Each CSS unit includes input circuits which couple to the priority network for detecting when the system bus is in an idle state. P bus logic circuits couple to the P bus and generate a transfer request in response to a request from its CSS unit only when the P bus is detected to be in an idle state. The idle signals from both buses are used to generate a system bus request for P bus access only when both buses are in an idle state so as to eliminate the need to contend for system bus use.

7 Claims, 5 Drawing Sheets

MINIMUM CONTENTION PROCESSOR AND SYSTEM BUS SYSTEM

RELATED PATENT APPLICATIONS AND PATENTS

1. The patent application of George J. Barlow and Donald L. Smith entitled, "High Performance Round Robin Distributed Bus Priority Network," filed on Oct. 5, 1990, bearing Ser. No. 07/593,407, which is assigned to the same assignee as this patent application.

2. The patent application of George J. Barlow and Donald L. Smith entitled, "Cancel mechanism for Resilient Resource Management and Control," filed on Oct. 5, 1990, bearing Ser. No. 07/593,916, issued as U.S. Pat. No. 5,168,564 on Dec. 1, 1992 and which is assigned to the same assignee as this patent application.

3. The patent application of George J. Barlow and Donald L. Smith entitled, "Flexible Distributed Bus Priority Network," filed on Oct. 5, 1990, bearing Ser. No. 07/593,436, issued as U.S. Pat. No. 5,150,466 on Sep. 22, 1992 and which is assigned to the same assignee as this patent application.

4. The patent application of Ming-Tzer Miu and Thomas F. Joyce entitled, "Production Line Method and Apparatus for High Performance Instruction Execution," filed on Dec. 19, 1988, bearing Ser. No. 07/286/580, now abandoned, which is assigned to the same assignee as this patent application.

5. The patent application of David E. Cushing, Romeo Kharileh, Jian-Kuo Shen and Ming-Tzer Miu entitled, "Dual Port Read/Write Register File Memory," filed on Dec. 19, 1988, bearing Ser. No. 07/286,552, issued as U.S. Pat. No. 4,933,909 on Jun. 12, 1990, which is assigned to the same assignee as this patent application.

6. The patent application of Jian-Kuo Shen, Richard P. Kelly, Robert V. Ledoux and Deborah K. Staplin entitled, "Control Store Addressing from Multiple Sources," filed on Dec. 19, 1988, bearing Ser. No. 07/286,578, which is assigned to the same assignee as this patent application.

7. The patent application of Richard P. Kelly, Jian-Kuo Shen, Robert V. Ledoux and Chester M. Nibby, Jr. entitled, "Control Store Double Pump Operation," filed on Dec. 19, 1988, bearing Ser. No. 07/286,581, issued as U.S. Pat. No. 4,916,601 on Apr. 10, 1990, which is assigned to the same assignee as this patent application.

8. The patent application of Richard P. Kelly and Robert V. Ledoux entitled, "Control Store Address Generator for Developing Unique Instruction Execution Starting Address," filed on Dec. 19, 1988, bearing Ser. No. 07/286,582, now abandoned, which is assigned to the same assignee as this application.

9. The patent application of David E. Cushing, Richard P. Kelly, Robert V. Ledoux and Jian-Kuo Shen entitled, "Mechanism for Automatically Updating Multiple Unit Register File Memories in Successive Cycles for a Pipelined Processing System," filed on Dec. 19, 1988, bearing Ser. No. 07/286,551, issued as U.S. Pat. No. 4,980,819 on Dec. 25, 1990 and which is assigned to the same assignee as this application.

10. The patent application of Richard P. Kelly and Robert V. Ledoux entitled, "Automatic Data Steering Mechanism for Alignment of Operands into and out of an Execution Unit," filed on Mar. 31, 1989, bearing Ser. No. 07/331,991, issued as U.S. Pat. No. 5,179,671 on Jan. 12, 1993 and which is assigned to the same assignee as this application.

11. The patent application of Robert V. Ledoux, Richard P. Kelly and Forrest M. Phillips entitled, "Ring Reduction Logic Mechanism," filed on Mar. 31, 1989, bearing Ser. No. 07/332,258, issued as U.S. Pat. No. 5,117,491 on May 26, 1992 and which is assigned to the same assignee as this application.

12. The patent application of Deborah K. Staplin, Jian-Kuo Shen and Ming-Tzer Miu entitled, "Resource Conflict Detection Method and Apparatus Included in a Pipelined Processing Unit," filed on Jun. 30, 1989, bearing Ser. No. 07/374,882 issued as U.S. Pat. No. 5,073,855 on Dec. 17, 1991 and which is assigned to the same assignee as this application.

13. The patent application of Deborah K. Staplin and Jian-Kuo Shen entitled, "Instruction Unit Logic Management Apparatus Included in a Pipelined Processing Unit," filed on Jun. 30, 1989, bearing Ser. No. 07/374,881, issued as U.S. Pat. No. 5,150,468 on Sep. 22, 1992 and which is assigned to the same assignee as this application.

14. The patent application of Forrest M. Phillips entitled, "Least Recently Used Replacement Level Generating Apparatus," filed on Sep. 1, 1989, bearing Ser. No. 07/402,192, issued as U.S. Pat. No. 5,125,085 on Jun. 23, 1992 and which is assigned to the same assignee as this application.

15. The patent application of Thomas F. Joyce, Ming-Tzer Miu and Richard P. Kelly entitled, "Apparatus and Method for Increased Operand Availability in a Data Processing Unit with a Store Through Cache Memory Unit Strategy," filed on Jan. 5, 1989, bearing Ser. No. 07/294,529, issued as U.S. Pat. No. 5,123,097 on Jun. 16, 1992 and which is assigned to the same assignee as this application.

16. The patent application of Thomas F. Joyce, Robert C. Miller and Marc Vogt entitled, "Apparatus and Method for Data Group Coherency in a Tightly Coupled Data Processing System," filed on Jan. 5, 1989, bearing Ser. No. 07/294,534, issued as U.S. Pat. No. 5,148,533 on Sep. 15, 1992 and which is assigned to the same assignee as this application.

17. The patent application of Forrest M. Phillips, Thomas F. Joyce and Ming-Tzer Miu entitled, "Apparatus and Method for Address Translation of Non-Aligned Double Word Virtual Addresses," filed on Jan. 5, 1989, bearing Ser. No. 07/294,528, issued as U.S. Pat. No. 5,051,894 on Sep. 24, 1991 and which is assigned to the same assignee as this application.

BACKGROUND OF THE INVENTION

1. Field of Use

This invention relates to resolving access to a system bus which grants access on a priority basis. More particularly, the present invention pertains to gaining access to a system bus by a plurality of processing units which connect in common to a private bus.

2. Prior Art

Some systems have simplified bus communications on a single communications bus by utilizing a busy status line that is monitored by each device connected in the system. In one such system, when a device desired to send a message, it initially proceeds to busy out the busy status line, by causing a busy flag to be placed on the line. The device also checks the busy status line in order to ascertain whether a busy flag was already set. If the bus is busy, the device cannot transmit until the bus becomes free and the requesting device resets the bus busy flag for a retry interval. This arrangement is disclosed in U.S. Pat. No. 4,281,380.

While the above arrangement reduces contention, it is predicated on the use of a single communications bus. Further, the arrangement is primarily directed to preventing simultaneous transmission of messages resulting in interference.

When there have been more than one bus involved, the approach has generally been to contend for the different buses in a sequential manner. In some systems, the amount of contention time has been reduced. For example, U.S. Pat. No. 4,901,226, which is assigned to the same assignee, discloses an arrangement for enabling processing units which connect in common to a local bus to access a system bus through a bus interface unit. While the arrangement minimizes the time required for resolving local bus priority and system bus priority, it still requires the units which connect to the two buses to contend for bus access.

In such systems, it may be possible to provide separate bus interfaces. However, this requires a considerable amount of additional logic circuits. Also, it still requires the units to contend for access to at least one bus, such as the system bus.

A further option is to provide completely separate buses. This is an extremely costly solution, since it essentially doubles the amount of circuits and interface connections. Further, the memory units which are required to connect to both buses will still be required to sort out the requests received from both buses and establish the order in which the requests should be processed. This can lead to the issuance of waits to processing units when the memory is unable to process the processing unit request.

Accordingly, it is a primary object of the present invention to provide an improved method and apparatus for processing requests made by a processing unit which connects to more than one bus.

It is a further object of the present invention to provide an arrangement for processing requests from a plurality of processing units in a manner which eliminates contention between such units.

SUMMARY OF THE INVENTION

The above and other objects of the present invention are achieved in a preferred embodiment of a multiprocessor system which is constructed to incorporate the principles of the present invention. The multiprocessor system includes a plurality of identical central subsystem (CSS) units, a number of memory subsystem units and a number of input/output subsystems. All of the units connect in common to a system bus which enables transfers of requests between a pair of units on a priority basis defined by a distributed priority network included as part of the system bus. Additionally, all of the CSS units and memory subsystem units connect in common to a private (P) bus used for high speed data transfers.

In accordance with the present invention, each CSS unit interface includes input circuits which couple to the bus priority network for detecting when the system bus is in an idle state or condition. Also, each CSS unit includes logic circuits which couple to the P bus for detecting when the P bus is in a busy state. The logic circuits, in response to a high speed transfer request from its CSS unit requiring access to the P bus, generates a request on the system bus only when both buses are in an idle state, thereby eliminating contention for either bus.

In the preferred embodiment, when the request for the high speed transfer is received and acknowledged by the memory subsystem, the system bus portion is complete. Thereafter, the requested data is transferred over the P bus to the requesting CSS unit which completes the P bus portion of the cycle of operation.

The above arrangement provides system bus access without incurring processor waits for simultaneous high speed transfer requests. Also, the arrangement reduces the likelihood of system bus saturation. Further, the arrangement requires a minimum amount of changes to be made to system bus interface circuits.

The novel features which are believed to be characteristic of the invention both as to its organization and method of operation, together with further objects and advantages, will be better understood from the description in the following section when considered in connection with the accompanying drawings described in this section. It is to be expressly understood, however, that each of the drawings is given for the purpose of illustration only and is not intended as a definition of the limits of the present invention.

DETAILED DESCRIPTION OF THE PREFERRED EMBODIMENT

Overall System

Figure 1:
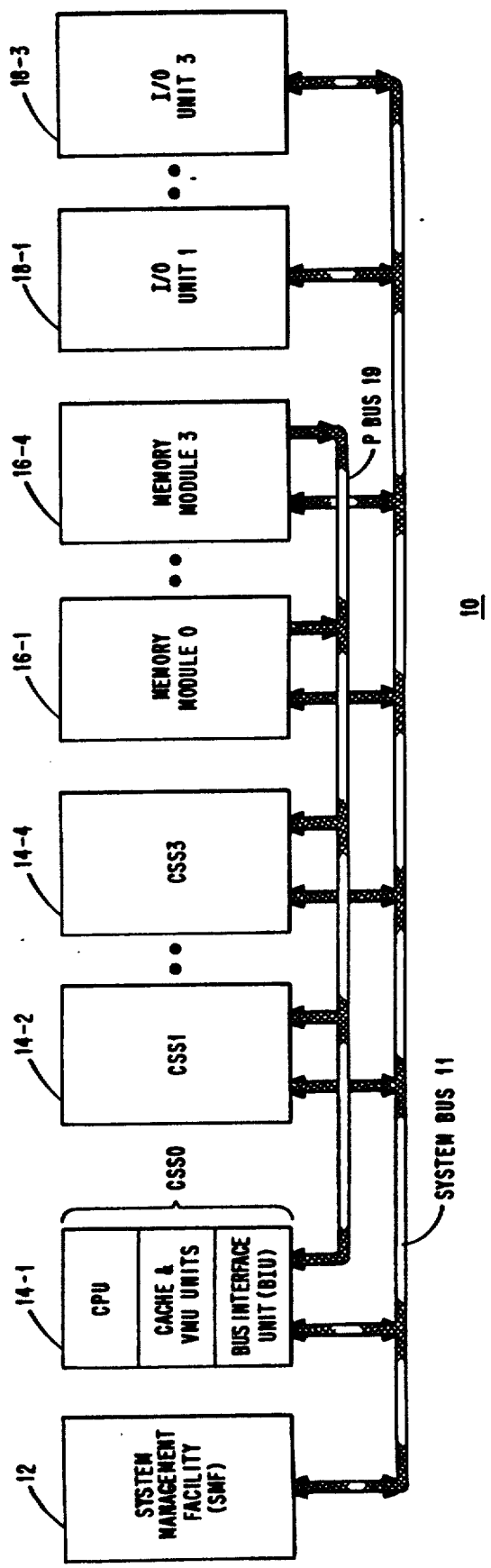
FIG. 1 is a block diagram of a multiprocessor system which incorporates the principles of the present invention.

FIG. 1 shows in block diagram form, a multiprocessor system 10 which incorporates the method and apparatus of the present invention. As shown, system 10 includes a system management facility (SMF) 12, a plurality of identical central subsystem (CSS) units 14-1 through 14-4, and a number of different subsystems 16 through 18 which are tightly coupled together by a system bus 11. The illustrative different subsystems include a number of memory subsystems 16-1 through 16-4 and a number of input/output subsystems 18-1 through 18-3. Additionally, the CSS units 14-1 through 14-4 and memory subsystems 16-1 through 16-4 connect in common to a unidirectional asynchronous processor (P) bus 19. Each subsystem includes an interface unit (BIU) which enables the subsystem to transmit or receive requests in the form of commands, interrupts, data or responses/status to another subsystem on the system bus 11 in an asynchronous manner.

At the left end of bus 11, a termination network not shown defines the high priority end of bus 11. The SMF unit 12 which is positioned to the right of the termination network has the highest priority. Bus priority decreases as a function of each subsystem's distance from the termination network. The different subsystems communicate requests over system bus 11 on a priority basis defined by a distributed priority network included within system bus 11. For more detailed information regarding this arrangement, reference may be made to U.S. Pat. No. 4,724,519.

CSS Unit

Figure 2:
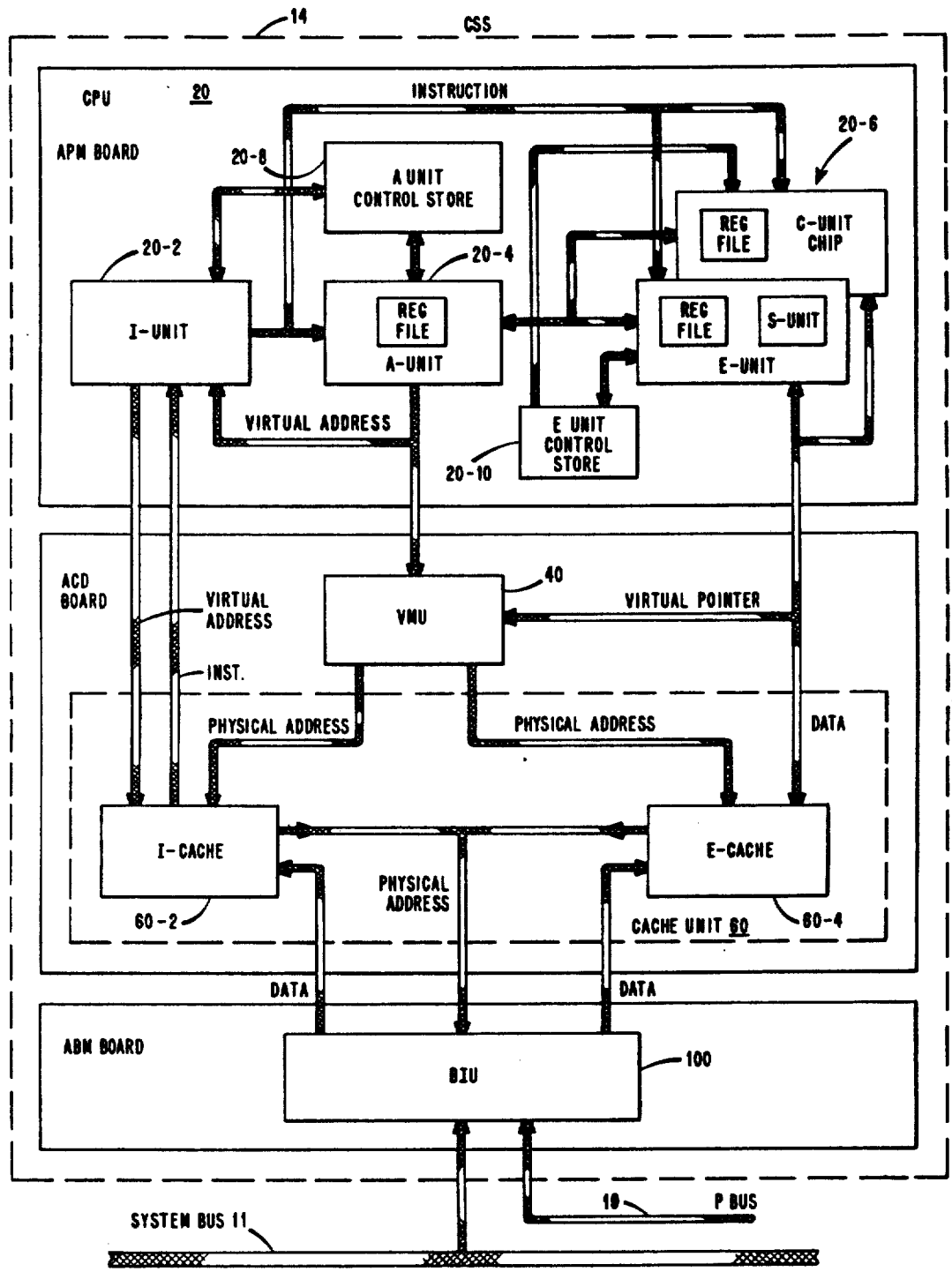
FIG. 2 is a block diagram of the central subsystem (CSS) unit of FIG. 1.

FIG. 2 shows in block diagram form, the central subsystem (CSS) unit 14 which takes the form of the production data processing system of the related patent application of Ming-Tzer Miu and Thomas F. Joyce. As shown, CSS unit 14 includes a central processing unit (CPU) 20, a virtual memory unit (VMU) 40 and a cache unit 60. The cache unit 60 couples to system bus 11 through a bus interface unit (BIU). The BIU 100 has four interfaces. It serves as an interface for CPU 20, VMU and cache unit stages, system bus 11 and processor (P) bus 19.

As shown, the main elements of CPU 20 include an instruction unit (I unit) stage 20-2, an address unit (A unit) stage 20-4 and an execution unit (E unit) stage 20-6. In the preferred embodiment, the execution unit stage 20-6 include a scientific unit (S-unit) and a commercial instruction processing unit (C-unit). The cache unit stage 60 includes an instruction cache (I-cache) 60-2 for storing instructions which are to be executed and an execution cache unit (E-cache) 60-4 for storing operands or data which are to be operated on according to the instructions being executed.

The I-unit 20-2 performs two main functions. It prefetches instructions from the I-cache unit 60-2 and cracks or decodes these instructions to determine how the other units, namely the A-unit 20-4 and the E-unit 20-6 will further process those instructions. In addition, the I-unit 20-2 executes certain branch instructions which are then removed from the production line.

The A-unit 20-4 generates addresses from instructions it receives from the I-unit 20-2. Additionally, it executes certain types of instructions such as register-to register type instructions removing them from the production line. When the instruction is to be executed by E-unit 20-6, the A-unit 20-4 sends a virtual address to VMU 40 which translates it into a physical address for fetching the specified operands from the E-cache unit 60-4. The operands fetched from the E-cache unit 60-4 are then transferred to the E-unit 20-6 for completing the execution of the instruction originally received by the I-unit 20-2 from the I-cache unit 60-2. The A-unit 20-4 will also confirm the execution of a branch instruction and send the branch address back to the I-unit 20-2 which will have already requested the next instruction from the I-cache unit 60-2 specified by the I-unit 20-2 prefetch branch address.

As seen from FIG. 2, both the A-unit 20-4 and E-unit 20-6 include register files which store the contents of the registers which are programmer accessible. Also, both the I-cache unit 60-2 and E-cache unit 60-4 are updated with instructions and operands fetched from main memory via system bus 11 and BIU 100.

As shown in FIG. 2, the I-unit stage 20-2 and A-unit stage 20-4 share a common firmware control store element 20-8. Similarly, E-unit and C-unit execution units 20-6 share another common firmware control store element 20-10.

The I-unit 20-2, A-unit 20-4 and E-unit 20-6 pipelined stages together with their control elements 20-8 and 20-10 occupy a mother circuit board. VMU stage 40 and cache unit stage 60 occupy a daughter board which plugs into the CPU mother board. The system bus and P bus interface circuits of BIU 100 occupy another mother board. Thus, the entire CSS unit requires two socket card positions within the system.

Bus Interface Unit Circuits 100

Figure 3:
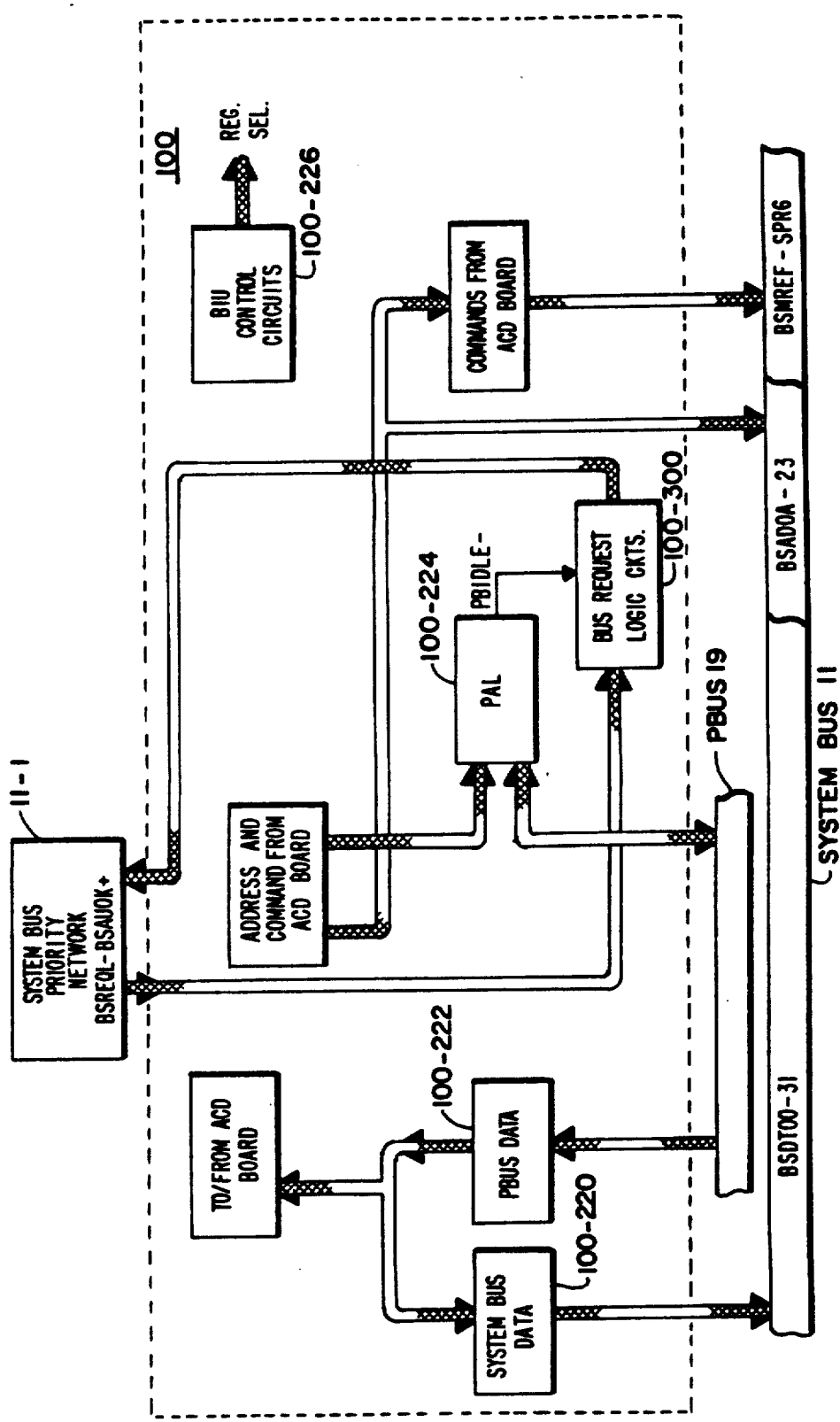
FIG. 3 is a block diagram of the bus interface unit (BIU) of FIG. 1.

FIG. 3 shows in block diagram form, the circuits of BIU 100 in greater detail. BIU 100 includes a number of registers. These include system bus and P bus data registers 100-220 and 100-222 which connect to system bus 11 and P bus 19, respectively.

Also, as shown, BIU 100 includes control circuits 100-226. These circuits provide the required control signals for selecting or enabling the different registers as required for processing requests received from cache unit 60 of FIG. 2.

In accordance with the present invention, control circuits, in the form of a programmable array logic (PAL) device 100-224, are connected to monitor the commands received from cache unit 60, in addition to the state of P bus 19. It generates a signal PBIDLE— when it decodes a P bus read command and a signal from P bus 19 indicating that P bus 19 is not busy (i.e., signal PBBUSY—).

As shown, BIU 100 further includes the bus request logic circuits of block 100-300. These circuits connect to system bus priority network 11-1 which forms a part of system bus 11. Additionally, the bus request logic circuits 100-300 are also connected to receive P bus idle signal PBIDLE— from PAL device 100-224. The bus request logic circuits 100-300 are used to handle private bus requests, in addition to system bus requests as explained herein.

Figure 4:
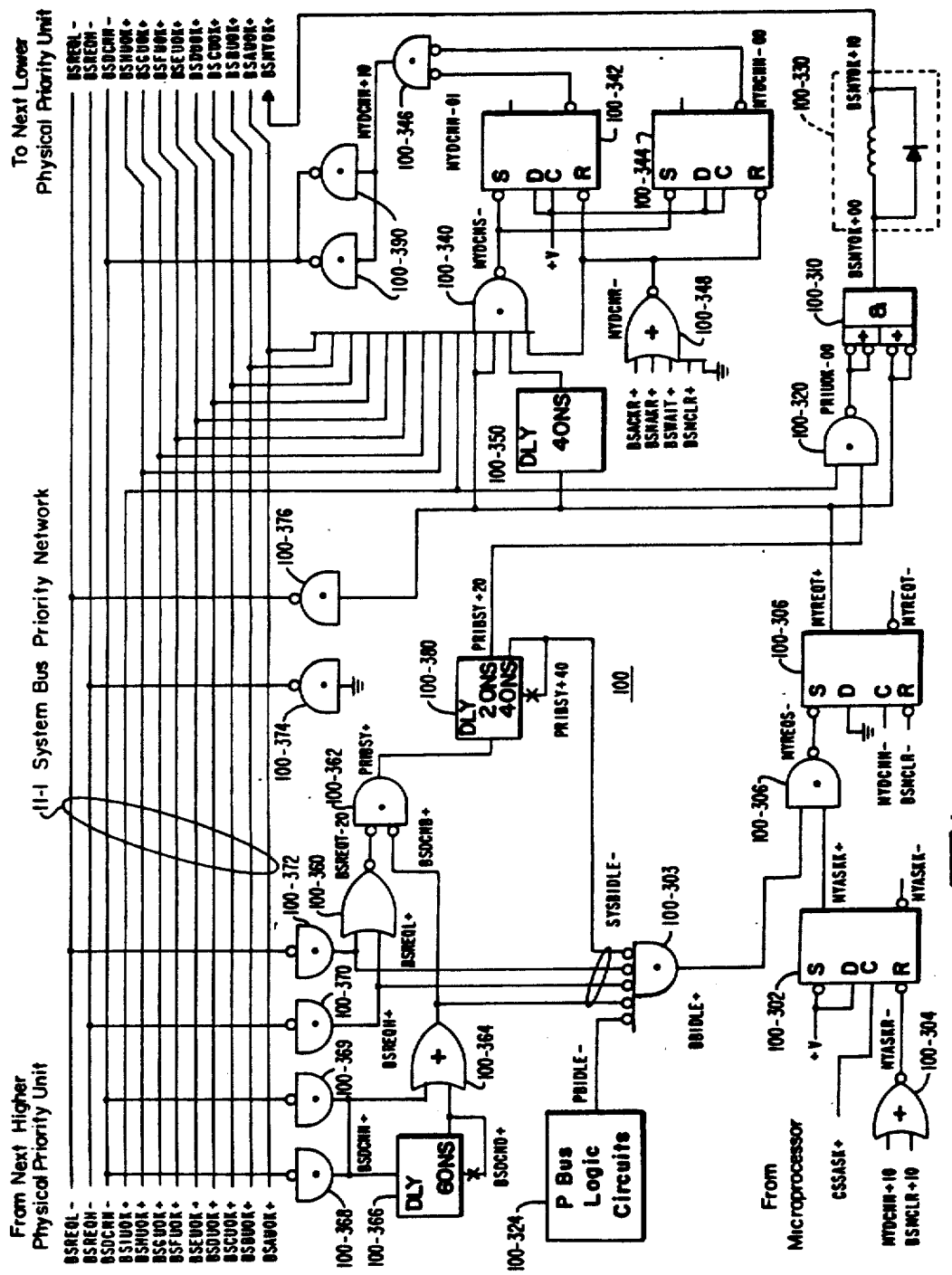
FIG. 4 shows in greater detail, the bus request logic circuits of FIG. 3.

Bus Request Logic Circuits—FIG. 4

FIG. 4 shows in greater detail, the bus request logic circuits of block 100-300. The block 100-300 includes a user ASK flip-flop 100-302 which is set to a binary ONE state in response to a user request signal. It is reset to a binary ZERO when signal MYASKR— is forced to a binary ZERO upon granting a system bus cycle (MYDCNN+10=1) or in response to a bus clear signal (BSMCLR+10=1). These signals are applied via a NOR gate 100-304.

When user flip-flop 100-302 is a binary ONE, and a both bus idle signal BBIDLE+ is forced to a binary ONE, a NAND gate 100-306 forces signal MYREQS— to a binary ONE causing a my request flip-flop 100-308 to switch to a binary ONE. This results in a bus low priority bus signal BSREQL— being forced to an active or low voltage state via a NAND gate 100-376.

In accordance with the present invention, the both bus idle signal BBIDLE+ is generated by a NAND gate 100-303 only when P bus idle signal PBIDLE— and system bus idle signal SYSBIDLE, which consists of the combination of bus signals BSREQL+, BSREQH+ and PRIBSY+40, are low indicating that both buses are idle.

Signal MYREQT+ causes the NOR/AND circuits of block 100-310 to force bus my OK signal BSMYOK+ to a binary ZERO when a prinet busy signal PRIBSY+20 indicates that the priority network is busy (signal PRIBSY+20=1) and oldest bus OK signal from the higher priority unit is a binary ONE. The signals BSIUOK+ and PRIBSY+20 are combined in a NAND circuit 100-320 which forces signal PRIUOK-00 to a binary ZERO.

Signal BSMYOK+00 is applied via a diode and inductor filter/slope control circuit included in a driver circuit 100-330. Signal BSMYOK+10 allows the other lower physical priority units to win access to system bus 11. That is, signal BSMYOK+10 is applied to line BSMYOK+ of nine skewed lower priority network lines to indicate to the next lower priority unit (CSS) and succeeding lower priority units that there is no higher priority unit which is requesting use of the next bus cycle, thereby allowing all such lower priority units to use the next bus cycle. That is, signal BSMYOK+ is one of the priority signals which are applied as an input to the grant flip-flop of each lower priority unit.

As shown, my request signal MYREQT+ is applied as one input to an input NAND gate 100-340 of a grant flip-flop constructed from a pair of flip-flops 100-342 and 100-344. This gate receives the nine prinet signals BSAUOK+ through BSIUOK+ which are combined with signal MYREQT+. The negation output signals MYDCNN-01 and MYDCNN-00 are applied to inverting inputs of an AND gate 100-346 which generates my data cycle now signal MYDCNN+10. The negation outputs of flip-flops 100-342 and 100-344 are used to avoid spikes or signal glitches. Also, the clock (c) and data (d) inputs of both flip-flops are tied to a logic 1 voltage to reduce spikes or signal glitches. Both flip-flops are reset to binary ZEROS when reset signal MYDCNR− is forced to a binary ZERO. Signal MYDCNR− when a binary ZERO inhibits the flip-flops from being set. Signal MYDCNR− is forced to a binary ZERO via a NOR gate 100-348 when bus master clear signal BSMCLR+, or bus wait signal BSWAIT+, or bus acknowledge signal BSACKR or bus negative acknowledge signal BSNAKR+ is forced to a binary ONE.

During each system bus cycle, there are three identifiable intervals. The first interval is the period of time required to determine the highest priority unit which is to be granted the bus cycle. This interval corresponds to the priority network resolution cycle which starts at the negative going edge of bus request signal BSREQT-20. Signal BSREQT-20 is generated when either bus high priority request signal BSREQH− or low priority request signal BSREQL− is applied via a NOR gate 100-360 and the input to AND gate 100-362 is forced low.

The first interval ends following the amount of asynchronous delay allowed within the system for priority to settle and for the selection of the high priority unit requesting use of system bus 11.

The next interval is the period during which the master unit calls the slave unit. This interval starts at the negative going edge of bus data cycle now signal BSDCNN−. The transition indicates that the use of system bus 11 has been granted to a master unit. Signal PRIBSY+40 prevents a new data cycle until 40 nanoseconds into a priority resolution cycle. This establishes a minimum interval of approximately 50 nanoseconds between requesting the system bus and being granted the bus.

The last interval is the period of time allocated for the response of the slave or receiving unit. This interval begins at the positive going edge of a strobe signal BSDCNB+. Signal MYDCNN+10, applied to the system bus 11, results in bus data cycle, now signal BSDCNN− being forced to a binary ZERO signalling the end of the system bus priority resolution cycle. This forces bus signal BSDCNN+10 to a binary ONE. After a delay of 60 nanoseconds by a delay circuit 100-366, an OR gate 100-364 forces signal BSDCNB+ to a binary ONE which clears the priority circuits for the next system bus resolution cycle.

DESCRIPTION OF OPERATION

With reference to FIGS. 1 through 4 and the timing diagram of FIG. 5, the operation of the system of the preferred embodiment will now be described. As seen from FIG. 5, when a CSS unit makes a read request, this causes a P bus read signal to be forced to a binary ONE state. The PAL circuit 100-224, in response to signal PBREAD and the PBBUSY− signal from P bus 19 indicating that the P bus 19 is not busy (i.e., is active or a binary ONE), forces low signal PBIDLE−. Signal PBIDLE− is applied as an input to bus request logic circuits of block 100-300.

As seen from FIG. 4, when the system bus 19 signals BSREQL−, BSREQH− and priority network busy signal PRIBSY+40 indicate that system bus 11 is idle, the collective signal SYSBIDLE− is forced to a binary ZERO. When both signals PBIDLE− and SYSBIDLE− are low, AND gate 100-303 forces both buses idle signal BBIDLE+ to a binary ONE as shown in FIG. 5.

Both bus idle signal BBIDLE+ causes my request flip-flop to switch to a binary ONE state. Since the system bus 11 is idle, the CSS unit will be granted priority. Therefore, the CSS's grant flip-flops will be set. This results in the generation of my data cycle now, signal MYDCNN+10 which is used to apply the command specifying a high speed transfer to system bus 11.

Figure 5:
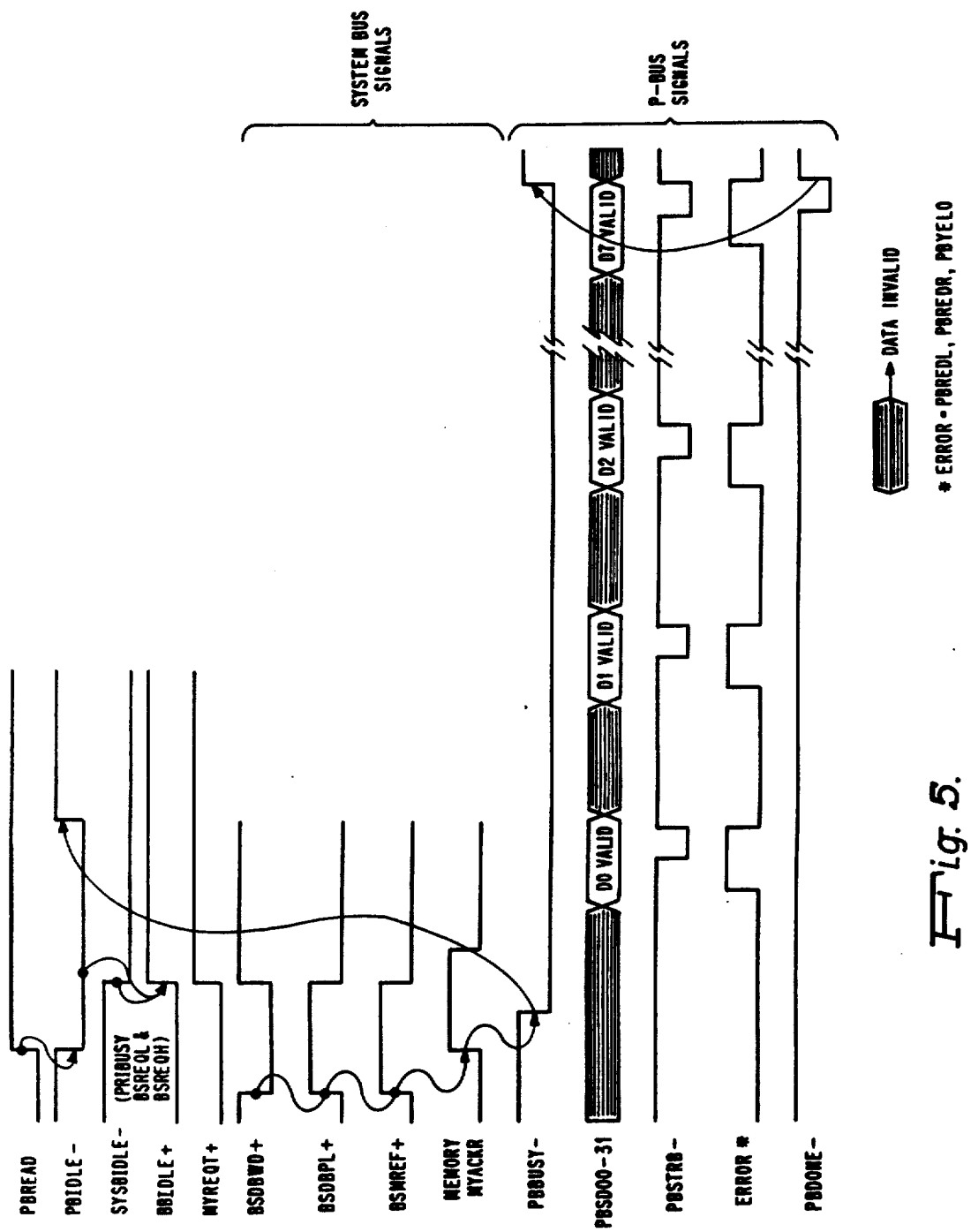
FIG. 5 is a timing diagram used in describing the operation of the present invention.

As seen from FIG. 5, system bus signal BSDBWD+ is forced to a binary ZERO, and signals BSDBPL+ and BSMREF+ are forced to binary ONES specifying a memory request involving P bus 19. In response to the memory request, the memory subsystem specified by the request acknowledges the request and forces the P bus busy signal low as shown. This completes the system bus portion of the cycle.

When the memory has the eight data words requested, it sends a series of data strobe signals PBSTRB−, each signal indicating the delivery of a 32-bit word. Along with the eighth strobe, the memory subsystem sends a done signal PBDONE−. This completes the cycle of operation. At the trailing edge of the signal PBDONE−, P bus busy signal PBBUSY− is reset as shown in FIG. 5.

From the above, it is seen how the method and apparatus of the present invention eliminates CSS unit contention for either P bus 19 or system bus 11. This is accomplished through the use of an extra interface pin which is forced to a state for indicating when the P bus is not busy. By applying this signal as an input to the system bus idle logic circuits, the P bus is made to appear as a logical extension of the system bus. When the P bus is not available, the system bus is not available.

It will be appreciated that the P bus is idle (i.e., PBIDLE−=0) when the P bus is in an idle state or if the CSS unit is issuing an I/O command, or memory write command which does not require use of the P bus.

There may be many changes made to the preferred embodiment of the present invention without departing from its teachings. For example, while the P bus of the preferred embodiment is used to transfer data in a single direction, the present invention also can be used with bidirectional buses. Also, the invention is not limited to the type of bus or system organization.

While in accordance with the provisions and statutes there has been illustrated and described the best form of the invention, certain changes may be made without departing from the spirit of the invention as set forth in the appended claims and that in some cases, certain features of the invention may be used to advantage without a corresponding use of other features.

What is claimed is:

1. A multiprocessor system comprising a number of central subsystem (CSS) units, a number of memory subsystem units and a number of input/output (I/O) subsystem units, each of which connect through an interface unit to a system bus for transferring requests between different ones of said units on said system bus on a priority basis, said system further including:

a private (P) bus for connecting in common, each of said number of CSS units and memory subsystem units for high speed transfer of data therebetween; and said interface unit of each CSS unit including:

control circuit means coupled to receive requests from said each CSS unit and to said P bus, said control circuit means upon detecting that said P bus is in an idle state and the receipt of a predetermined type of request specifying a P bus data transfer generating a first bus idle signal;

bus request logic circuit means connected to said system bus and to said control circuit means, said bus request logic circuit means including:

detector circuit means connected to said system bus for generating a second bus idle signal indicating when said system bus is in an idle state;

logic circuit means connected to said control circuit means and to said detector circuit means, said logic circuit means combining said first and second bus idle signals to produce a composite idle signal for indicating when both buses are in an idle state; and, request circuit means connected to said logic circuit means and to receive a request signal indicative of said predetermined type of memory request, said request circuit means transferring said request to said system bus for receipt by a designated one of said memory subsystem units only in response to said composite idle signal so as to eliminate the need to contend for system bus use.

2. The system of claim 1 wherein said predetermined type of memory request specifies a P bus high speed data transfer operation, said designated one of said memory subsystem units in response to each said predetermined type of memory request generating an acknowledgement signal completing an initial portion of processing said request enabling use of said system bus in processing other requests.

3. The system of claim 2 wherein said memory subsystem further includes means for transferring a predetermined number of data words on said P bus completing the processing of said memory request.

4. The system of claim 1 wherein each of said interface units further includes command generating circuits coupled to said system bus for generating P bus requests and wherein said control means includes a programmable array logic (PAL$\phi$) circuit connected to said command generating means, said PAL circuit being connected to said P bus and to said command generating circuits for generating said composite idle signal when said P bus is idle indicated by the state of a P bus busy signal generated by said memory subsystems and in response to said predetermined type of request.

5. A method of organizing a system which includes a plurality of central subsystems, each of which connect in common to a private (P) bus with a plurality of memory units for transferring blocks of data at high rates and wherein said plurality of central subsystems and said memory units, each connect in common to a system bus with a plurality of input/output units for transferring requests between a pair of units on a priority basis through bus interface sections included within each of said units, said method comprising the steps of:

(a) including in each of said interface sections, a programmable control circuit coupled to receive requests from one of said CSS units and to said P bus for receiving at least one signal indicating the state of said P bus;

(b) generating a first bus idle signal by said programmable control circuit upon receipt of a predetermined type of request specifying a P bus data transfer and said one signal indicating that said P bus is in an idle state;

(c) generating a second bus idle signal by detector circuits connected to said system bus for indicating when said system bus is in an idle state;

(d) generating a composite bus idle signal by logically combining said first and second bus idle signals for indicating when both buses are in an idle state; and, (e) requesting access to said system bus for transferring said predetermined type of request to a designed memory subsystem only in the presence of said composite idle signal bus thereby minimizing the amount of contention.

6. The method of claim 5 wherein said method further includes the step of said designated memory subsystem generating in response to each said predetermined type of memory request, an acknowledgement signal signalling completion of an initial portion of processing said request enabling use of said system bus.

7. The method of claim 6 wherein said method further includes the step of transferring a predetermined number of data words on said P bus completing the processing of said memory request.

* * * * *